May 23, 1933.   J. N. KIEP   1,910,697
HYDRAULIC POWER TRANSMITTER
Filed Oct. 22, 1930   5 Sheets-Sheet 3

INVENTOR
Johann Nikolaus Kiep.
BY
ATTORNEYS

Patented May 23, 1933

1,910,697

UNITED STATES PATENT OFFICE

JOHANN NIKOLAUS KIEP, OF ALTONA-HOCHKAMP, GERMANY

HYDRAULIC POWER TRANSMITTER

Application filed October 22, 1930, Serial No. 490,385, and in Germany November 7, 1929.

This invention relates to the so called vulcan type or Föttinger type of hydraulic power transmitter or fluid clutch in which a pair of driving and driven members are each provided with an annular series of vanes, blades or passages, and the two members are so designed and so juxtaposed that the impelling liquid while traveling in the operating circuit defined by said blades or passages effects the rotation of the driven member in response to the rotation of the driving member. Such a construction is shown and broadly claimed in the Föttinger Patent #1,199,359 of September 26, 1916.

The present invention particularly contemplates a new and improved means for expediting the evacuation of the operating circuit of the coupling to stop or reduce the rate of rotation of the driven member. I accomplish this by an axial displacement of either the driving or the driven member. In a preferred embodiment of the invention, the operating circuit has leading therefrom a discharge port which is normally closed by one of said members during transmitting operations and which is uncovered during a relative axial displacement of said members to permit the fluid to be centrifuged from said circuit.

As another feature, the expediting of the discharge of the operating circuit is effected through the provision of a discharge port leading from the operating circuit of said coupling, and extending approximately in the same direction as the direction of discharge of the fluid from said circuit.

The present invention also contemplates means for expediting the filling of the operating circuit of the coupling. This is effected in accordance with the present invention by providing an axial passageway having a port leading therefrom into the operating circuit, and a port leading thereto from a suitable source of fluid supply, such as a reservoir tank. The port leading into the operating circuit is at a greater radial distance from the axis of rotation than the port associated with the reservoir tank, so that a difference in centrifugal components in the two ports is effected. By means of this arrangement a pump-like effect is produced which may be sufficient to dispense with the usual auxiliary pumping adjuncts.

The invention also provides a new and improved means for venting the air from the operating circuit, and provides therefor a conduit extending from a port proximate the core of the operating circuit, and leading to the exterior of one of the main members. Thus the air may rapidly escape as the liquid is admitted and the rapid filling insured. The invention also includes certain new and important features of construction and combinations of parts hereinafter set forth and claimed.

Although the novel features which are believed to be characteristic of this invention will be particularly pointed out in the appended claims, the invention itself, as to its objects and advantages, the mode of its operation and the manner of its organization may be better understood by referring to the following description taken in connection with the accompanying drawings forming a part thereof, in which

Like reference characters denote like parts in the several figures of the drawings.

In the following description and in the claims, parts will be identified by specific names for convenience, but they are intended to be as generic in their application to similar parts as the art will permit.

In the specific construction shown in Figs. 1 to 6 there is provided a driving shaft 10 having rotatably associated therewith a primary turbine wheel or driving member 11 constituted by an outer dished ring 12 and an inner dished ring 13, these rings being joined together by a plurality of vanes 14. The secondary or driven part of the coupling includes a dished ring 15 and a dished ring 16 joined together by vanes similar to vanes 14 and rotatably associated with a driven shaft 17. The dished rings 13 and 16 are juxtaposed to conjointly form the core for the operating circuit of the impelling fluid, the fluid therein traveling around said core in the direction indicated in Fig. 1.

In order to rotate the driving member 11 in conjunction with the shaft 10 while permitting said member to be displaced axially, said shaft is provided with means including a bore 18 and a flange 19. Extending from said flange 19 are a plurality of pins 20 which engage holes 21 in the hub of the driving member 11. Extending from the hub of the driving member 11 is a shaft 22 which fits within the bore 18 of the shaft 10 and has a spline connection with said shaft 10.

The preferred means for reciprocating the shaft 22 is shown as follows:

The shaft 22 at one end has an enlarged circular portion 23 which is embraced by a correspondingly enlarged portion 24 connected to the shaft 10. Passing through the enlarged portion 23 is a pin 25, the ends of which extend through longitudinal slots 26 in the portion 24 to engage a collar 27 embracing said portion 24. This collar 27 has a flange 28 which cooperates with a nut 29 to axially confine a ring 30 having a pair of projecting pins 31. (See Fig. 5.) The ring 30 is saddled by a yoke 32 which is pivoted to a bracket 33 and which engages the pins 31. The yoke may be tilted by any suitable means to shift the collar 27 and its associated shaft 22 axially while holding the ring 30 against rotation.

The liquid for filling the operating circuit is kept in a reservoir tank 34 and the shaft 10 is partially supported by a bearing 34a which is associated with said tank. This tank forms with the shaft 10 an annular passageway 35 having a connection 35a with the interior of said reservoir. For filling the operating circuit of the coupling, the driving member 11 has a plurality of annularly arranged ports 36 communicating with the passageway 35 and leading into the operating circuit of the coupling. Each of these ports terminates in a conduit 37 extending to a point proximate the outer periphery of the core. This arrangement serves to induce the flow of liquid from the reservoir tank 34 into the operating circuit in response to the rotation of the driving member 11.

Figure 3:
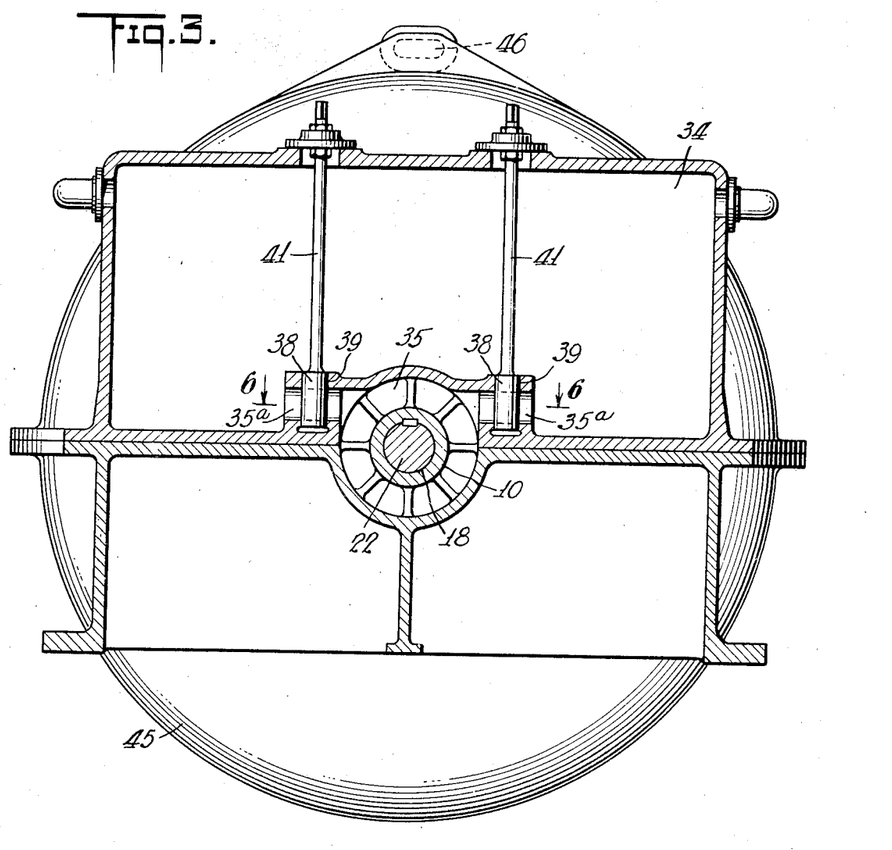
Figure 4:
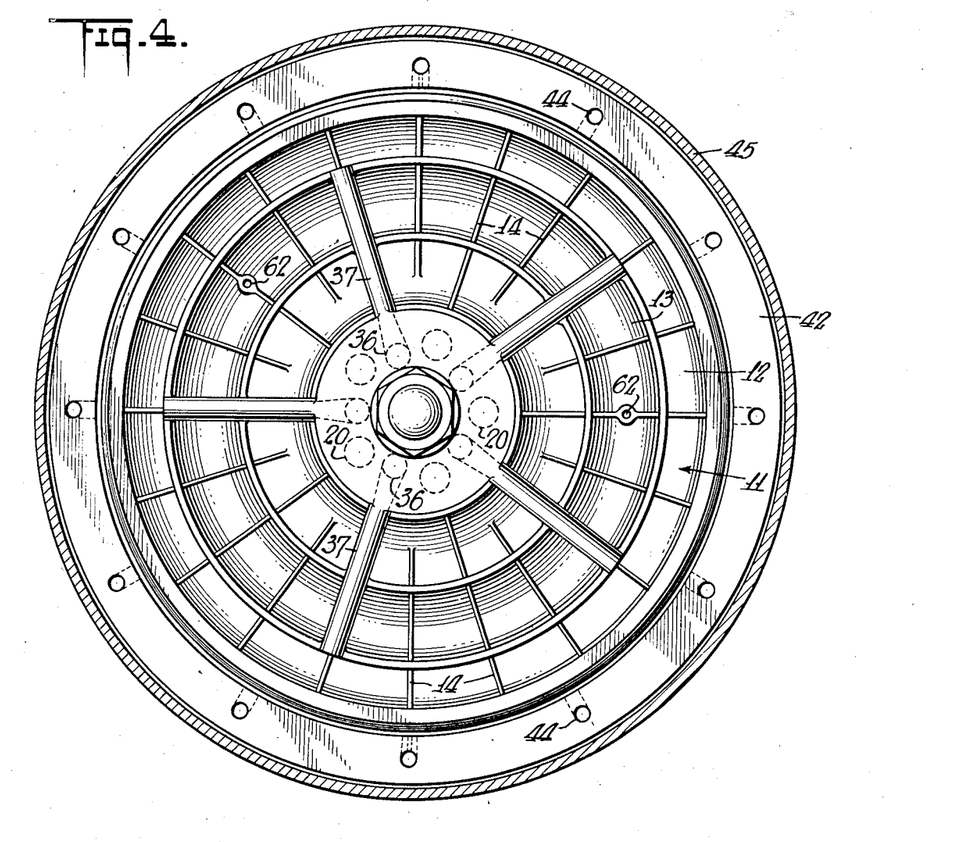
Figure 5:
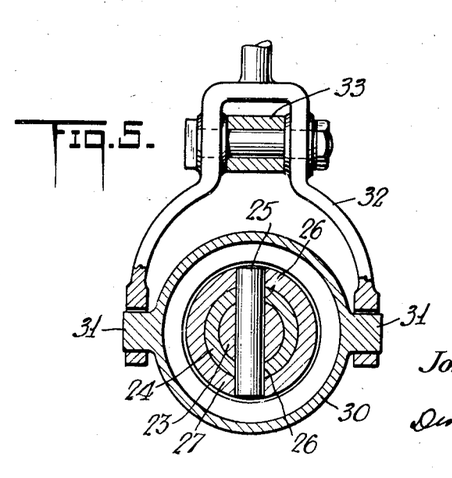
Figure 6:
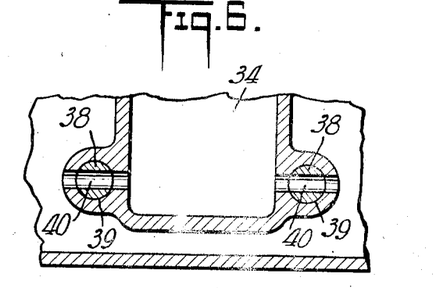
Fig. 6 is a section taken on line 6—6 of Fig. 3.

The flow of liquid from the reservoir tank 34 into the passageway 35 and through the pumping ports 36 may be controlled by means of rotary valves 38 having a passageway 40 therethrough and mounted for rotation in cylindrical valve chambers 39 of the reservoir tank (see Figs. 3 and 6). Each of the rotary valves 38 is connected to one end of a valve stem 41, the other end of which extends outside the reservoir casing to receive a suitable turning tool.

For the purpose of discharging the operating circuit, a dished member 42 is provided, which is connected to the flange 19 for rotational movement therewith. It has connected thereto a dished member 43 so as to conjointly form a rotatable casing enclosing the dished rings 12 and 15 of the main driving and driven members. These dished members 42 and 43 are bored to form ports or conduits 44 at the periphery extending in a direction inclined to the axis of the shaft 10.

Surrounding the members 42 and 43 and forming an integral part of the reservoir 34 is a stationary casing 45 which is provided with a discharge conduit 46, extending in the same general direction as the ports or conduits 44 and adapted to discharge into a cooling tank 47. During normal operations the ports 44 are closed by a split ring 48 disposed in a groove on the outer periphery of the driving member 11. Under the action of centrifugal force this split ring 48 is urged into sealing relationship with the inlet ends of the ports 44 so that the escape of any fluid therethrough is prevented.

Figure 1:
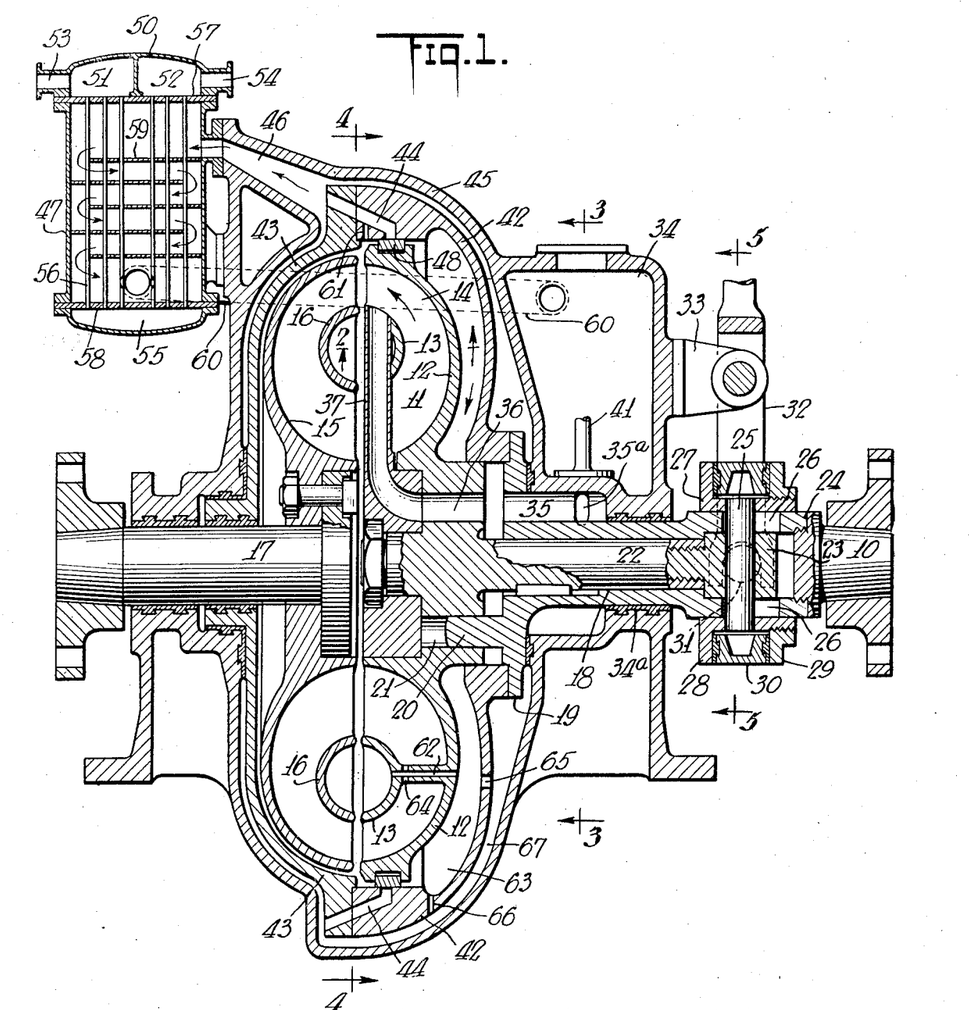
Fig. 1 shows a longitudinal section through a coupling, embodying the present invention.
Figure 2:
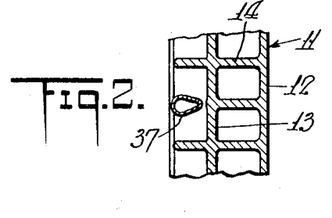
Figs. 2, 3, 4 and 5 are sections taken on lines 2—2, 3—3, 4—4, and 5—5, respectively, of Fig. 1.

When it is desired to evacuate the operating circuit, the yoke 32 is shifted to move the shaft 22 and driving member 11 to the right from the position shown in Fig. 1 so that the ports 44 are uncovered. When the driving member 11 is in this position, the fluid will be centrifuged from the operating circuit through the ports 44 and into the discharge conduit 46, and then into the cooling tank 47.

This cooling tank 47, in the form illustrated, includes a header 50 at one end divided into two compartments 51 and 52 and having an inlet conduit 53 and an outlet conduit 54 respectively. The other end of the tank 47 is provided with a header 55 which is connected to the header 50 through the instrumentality of a plurality of pipes 56, running through crown plates 57 and 58. Disposed in the tank 47 are a plurality of baffle plates 59, which serve to direct the liquid escaping from the conduit 46 in a circuitous path of travel to the bottom of the tank. A connection 60 is provided between the tank 47 and the reservoir 34 so that the liquid in said tank 47 is permitted to gravitate into said tank 34.

It should be noted that the discharge passages 44 and 46 extend in a direction which is somewhat tangential to the path of travel of the fluid near the outlet of the driving member 11 when said member has been shifted to expose the ports 44. In this manner retarding influences are obviated and a more efficient centrifugal discharging of the impelling liquid is induced.

In order to effect the cooling of the impelling fluid during transmitting operations, a continuous circulation between the reservoir tank 34 and the operating circuit of the coupling may be maintained. For this purpose a small by-pass 61 is provided leading to the passage 44 from the operating circuit of the coupling. During running operations the valves 38 may be slightly cracked to permit this slow circulation of the fluid.

If no cooling is necessary, the tank 47 and the ports 61 may be omitted and the fluid discharged from the passage 46 directly to the reservoir 34.

For venting the air from the operating circuit of the coupling, the core of said circuit has extending therefrom one or more conduits 62 bounded by vanes 14 and extending in a direction substantially parallel to the axis of rotation. This conduit 62 leads into the chamber 63 defined between the dished members 12 and 42. Small holes 64 are provided in the vanes 14 outside the core so that the air is permitted to escape from both inside and outside of said core. The dished member 42 is provided with holes 65 and 66 to permit the vented air to escape into a chamber 67 and through the discharge conduit 46.

Figures 7, 8, 9:
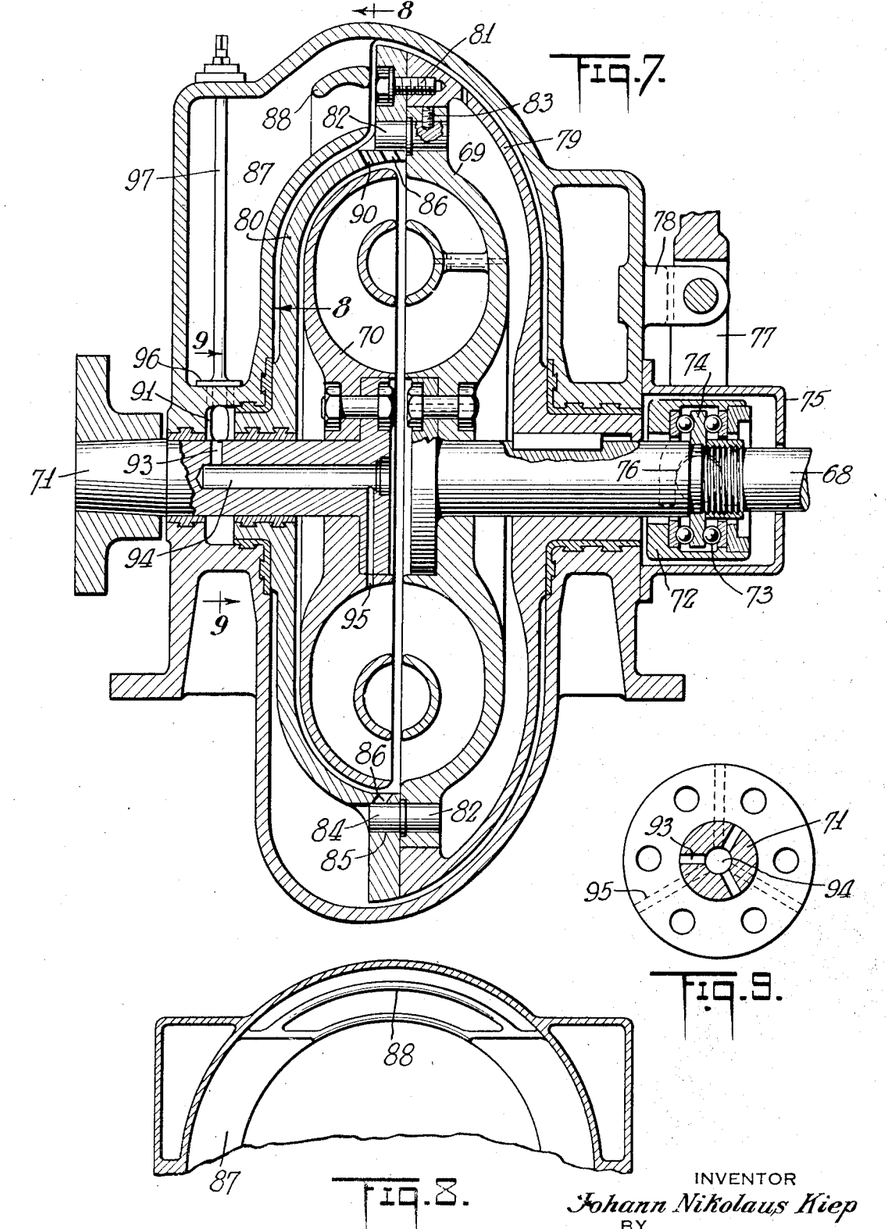
Fig. 7 is a longitudinal section showing another form of coupling.
Figs. 8 and 9 are sections taken on lines 8—8 and 9—9 of Fig. 7.

In Figs. 7, 8 and 9 there is shown another form of coupling constructed for discharging the operating circuit in response to the axial displacement of either the driving or the driven member. In this form a driving shaft 68 is bolted to a dished ring 69 constituting part of the driving member of the coupling. The driven portion of the coupling includes the dished ring 70 connected to a driven shaft 71.

The means for effecting the axial displacement of the driving member may include a sleeve 72 adapted to hold a ball thrust bearing arrangement 73 for permitting rotation of a disc 74 secured to the driving shaft 68. This sleeve 72 with its associated bearing arrangement 73 is enclosed in a casing 75 which is provided with longitudinal slots, (not shown) for the passage therethrough of pins 76 projecting from said sleeve 72. This casing 75 is saddled by a yoke 77 which is pivoted to a bracket 78 and which engages said pins 76. By means of this arrangement the shaft 68 may be shifted axially without stopping its rotation.

Splined to the shaft 68 for rotational movement therewith is a dished member 79 which embraces the outside periphery of the dished ring 69 and which is connected to a dished member 80 by means of a plurality of annularly arranged bolts 81 to form a rotatable casing for the driving and driven members. The dished ring 69 is provided with a plurality of pins 82 fastened to said ring by any suitable means, such as, for instance, studs 83. Each pin has projecting portions 84 adapted to fit into a corresponding hole 85 in the dished member 80. The projecting portions 84 of these pins are adapted to cover corresponding ducts 86 leading from the operating circuit of the coupling. When the yoke 77 is actuated to discharge the operating circuit, the shaft 68 is shifted to the right, from the position shown in Fig. 7, so as to uncover these ducts 86. This permits liquid from the operating circuit to centrifuge through said ducts into a stationary casing forming a reservoir 87.

To obviate the splashing and agitation of the impelling fluid as it is centrifuged from the operating circuit, a guide member 88 is provided which forms an integral part of the reservoir 87 and which is disposed in the line of travel of the discharging fluid. This guide member 88 serves to redirect the discharging fluid downwardly.

In order to permit continuous circulation of the impelling fluid between the operating circuit and the reservoir tank 87 during the running operations, a small by-pass 90 may be provided leading from the operating circuit into the interior of said tank, and out of the path of the portions 84 of the pins 82.

The novel means shown for expediting the filling of the operating circuit includes an annular passageway 91 leading from the interior of the reservoir tank 87 and surrounding the driven shaft 71. This is formed between the end of the hub of the dished member 80 and the coacting parts of the stationary casing. This driven shaft is provided with a plurality of radially extending ducts 93 leading from said passageway 91 into one end of an axial bore 94. The other end of said axial bore 94 is provided with a plurality of radially extending ducts 95 leading into the interior of the operating circuit of the coupling and each having an outlet which is disposed at a greater radial distance from the axis of rotation than the inlet portion of each duct 93. By means of the difference in the centrifugal components in the two sets of ducts resulting from this difference in radial distance, a pump-like effect is produced which is sufficient to permit dispensing with the usual pumping adjuncts.

The flow of fluid into the passageway 91 and thence into the operating circuit may be controlled by valves 96 which may be similar in construction to the valves 38 of Fig. 3 and similarly operated through the manipulation of valve stems 97.

When the driving shaft 68 is rotating and the driven shaft 71 is stationary, the liquid from the reservoir tank 87 will gravitate through the ducts 94 and 95 and into the lower part of the operating circuit, and will be taken up by the rotating driving member 69 and impelled against the driven member 71. The driven member, therefore, will start to rotate, and as it rotates produces a pump-like effect to increase the flow of liquid into the operating circuit.

Figure 10:
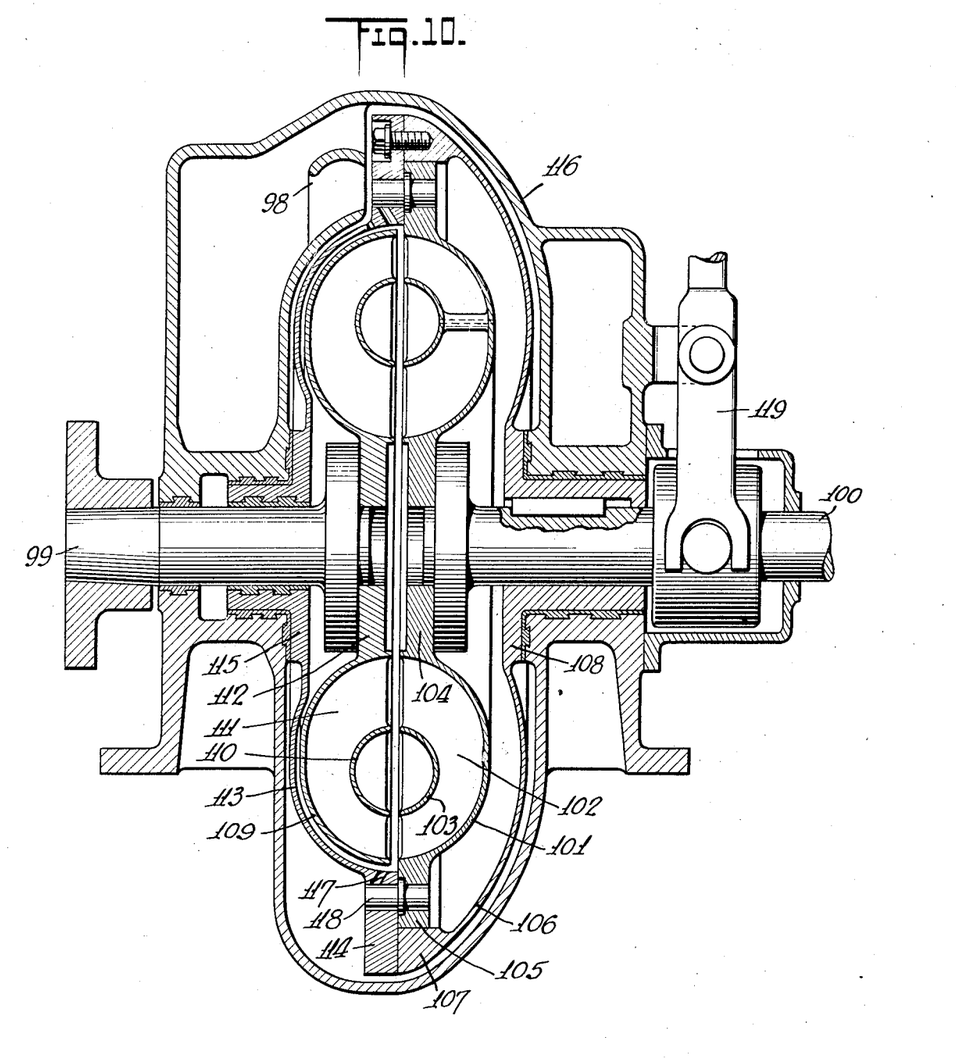
Fig. 10 shows another form.

I am aware that it has been proposed to render a hydraulic coupling non-operative by a relative axial movement of the driving and driven members, but this has been to prevent the fluid discharged from the driving member from acting effectively on the vanes of the driven member. In my improved construction, the axial movement is utilized to control the discharge of the fluid from the operating circuit so that it is no longer acted upon by the driving member. In Fig. 10, there is shown a construction which is similar to that shown in Fig. 7, except that the elements thereof are so constructed as to reduce their weight and size. In this construction, as in the other constructions heretofore described, there is provided a shaft 99 which is driven by a shaft 100 through a hydraulic coupling of the general type heretofore described. Mounted on said driving shaft is an outer dish ring 101 which is constructed of a single stamping or forging. Welded on to said dish ring are a plurality of vanes 102 having the inner peripheries thereof welded to the inner dish ring 103. In assembling the vanes to the inner and outer dish rings, these vanes are preferably first welded to the outer dish ring 101, and then the inner dish ring 103 is welded in position on to said vanes.

The dish ring 101 is provided with thicker flanges 104 and 105, the latter flange serving to connect the ring 101 to the shaft 100.

The driven member has an outer driven dish ring 109 and an inner dish ring 110 constructed similarly to the rings 101 and 103 of the driving member, with the vanes 111 welded therebetween. An annular flange 112 is provided in the inner periphery of said ring 109, by means of which said ring may be mounted in position with respect to the shaft 99.

The outer casing member 106 is constructed in a similar manner, and is advantageously made of a stamping or forging, and has thicker marginal flanges 107 and 108. The casing member 113 is constructed of a stamping or forging, and is provided with flanges 114 and 115, the flange 115 serving as a sleeve bearing for encircling the shaft 99, and the flange 114 serving to connect said casing to the casing 106. The flanges 104, 105, 112, 114, 115 and 108 may be integral with the dished parts or welded thereto.

A guide member 98 is provided in the reservoir 116 as already described, to redirect the liquid discharging from the operating circuit into said reservoir.

The casing 116 is non-rotatable and serves as a support for suitable means, such as the lever 119, for moving axially the driving member 101 and thereby moving axially the pins 118 which control the ports or ducts 117.

Having thus described my invention, what I claim as new and desire to secure by Letters Patent is:

1. A hydraulic coupling including a driving and a driven member conjointly defining a fluid operating circuit, said coupling being provided with a discharge port which leads from said operating circuit and which is closed during transmitting operations, and means for moving one of said members axially whereby said port is uncovered, and the impelling fluid permitted to discharge therethrough under the action of centrifugal force.

2. A hydraulic coupling including a driving and a driven member conjointly defining a fluid operating circuit, said coupling being provided with a discharge port which leads from said operating circuit adjacent its periphery, a ring engaging one of said members and serving to close said conduit during operating periods, and means for axially moving said ring with its engaging member whereby said port is uncovered and the impelling fluid permitted to be discharged therethrough from the operating circuit.

3. A hydraulic coupling including a driving and a driven member conjointly defining a fluid operating circuit, said coupling being provided with a discharge conduit which leads from said operating circuit and which is closed by said driving member during transmitting operations, and means for axially moving said driving member whereby said conduit is uncovered and the impelling fluid permitted to discharge therethrough, said conduit extending in a direction proximately tangential to the path of travel of the fluid near the fluid outlet of the driving member when said member has been shifted to expose the discharge conduit.

4. A hydraulic coupling including a driving and a driven member, said members being relatively movable axially and conjointly defining a fluid operating circuit, said coupling being provided with a discharge hole parallel to the axis of rotation, and a duct extending from the operating circuit to said discharge hole, a pin secured to and extending from one of said members into said hole during transmitting operations, so as to close said duct, and means for effecting relative axial movement of said members to move said hole and pin relatively axially whereby the duct is uncovered and the fluid permitted to discharge through said hole.

5. A hydraulic coupling including a driving and a driven member conjointly defining a fluid operating circuit, a pair of dished members secured together and forming a casing enclosing said driving and driven member, one of said dished members having a discharge port parallel to the axis of rotation, and also having a duct extending from said operating circuit to said discharge port, a pin extending from one of said first mentioned members, and closing said port during transmitting operations so as to close said duct, and means for moving one of said first mentioned members axially in said casing to effect the separation of said port and pin whereby the duct is uncovered and the fluid permitted to discharge through said port.

6. A hydraulic coupling including a driving and driven member conjointly defining an operating circuit, having a core member, and a vent conduit leading from said core member and extending in a direction proximately parallel to the axis of rotation to a point outside one of said members, said vent conduit having openings inside and outside of the core closely adjacent to the wall of the core member.

7. A hydraulic power transmitter including a driving and a driven member conjointly defining a fluid operating circuit, a rotatable casing enclosing both of said members and secured to one of said members to prevent relative rotation of said casing and said member, but permit relative axial movement, a stationary casing enclosing said rotatable casing, said rotatable casing having a discharge port leading into said stationary casing, and means for effecting relative axial movement of said last mentioned member and said rotatable casing to control said port to permit or prevent evacuating of said operating circuit.

8. A hydraulic power transmitter including driving and driven members conjointly defining a fluid operating circuit, a rotatable casing enclosing said members and secured to one of said members, a stationary casing enclosing said rotatable casing, said rotatable casing having a discharge port leading into said stationary casing, means for moving one of said members axially to control said port.

9. A hydraulic power transmitter including driving and driven members conjointly defining a fluid operating circuit, a rotatable casing enclosing said members and secured to one of said members, a stationary casing enclosing said rotatable casing, said rotatable casing having a discharge port leading into said stationary casing, one of said members being axially movable in said rotatable casing, and having means for controlling said port.

10. A hydraulic power transmitter including driving and driven members conjointly defining a fluid operating circuit, a rotatable casing enclosing said members and secured to one of said members, a stationary casing enclosing said rotatable casing, said rotatable casing having a discharge port leading into said stationary casing, one of said members being axially movable in said rotatable casing, and having a pin movable in said port to control the latter and the evacuating of the operating circuit.

11. A hydraulic power transmitter including driving and driven members conjointly defining a fluid operating circuit, a rotatable casing enclosing said members and secured to one of said members, a stationary casing enclosing said rotatable casing, said rotatable casing having a discharge port leading into said stationary casing, said driving member being axially movable in said rotatable casing, and having a peripheral ring engaging said rotatable casing to control said port.

12. A hydraulic coupling including a driving member and a driven member conjointly defining a fluid operating circuit, a reservoir tank partly enclosing said members, a discharge passage extending from the periphery of the operating circuit to the upper part of said tank, and a guide member disposed in said tank in the line of travel of the discharging fluid, and adapted to redirect said discharging fluid towards the lower portion of the tank.

13. A hydraulic coupling including a driving member and a driven member conjointly defining a liquid operating chamber, a stationary casing enclosing at least a portion of the upper parts of said members, and including a reservoir tank mounted above the axis of the coupling, a valve controlled port for delivering liquid from said reservoir tank by gravity into the interior of said chamber, and a discharge port extending from the upper portion of the outer periphery of said chamber, for delivering said liquid to said reservoir tank.

14. A hydraulic coupling including a driving member and a driven member conjointly defining a liquid operating chamber therebetween, a stationary casing enclosing at least part of said members and forming a reservoir tank, said reservoir tank having the bottom thereof disposed above the axis of said coupling, and a valve controlled passageway leading from the bottom of said tank and extending axially into the interior of said operating chamber.

15. A hydraulic coupling including a driving member and a driven member conjointly defining a liquid operating chamber therebetween, a stationary casing enclosing at least part of said members and forming a reservoir tank, said reservoir tank having the bottom thereof disposed above the axis of said coupling, and a valve controlled passageway leading from said tank into the interior of said chamber, whereby the liquid may flow by gravity from said tank to said chamber.

16. A hydraulic coupling including a driving member and a driven member conjointly defining a liquid operating chamber therebetween, a rotatable casing enclosing said members, a stationary casing enclosing said rotatable casing and including a reservoir tank, means for controlling the discharge of liquid from said rotatable casing to said stationary casing, and means for controlling the return of liquid from said reservoir to said chamber.

17. A hydraulic coupling including a driving member and a driven member conjointly defining a liquid operating chamber therebetween, a stationary casing enclosing at least a portion of the upper part of said members, a portion of said casing above the axis of rotation of said coupling forming a reservoir tank, means for controlling the discharge from the periphery of said chamber to said reservoir tank against the action of gravity, and means for controlling the return of the liquid from said tank to the center of said chamber.

18. A hydraulic coupling including a driving member and a driven member conjointly defining a liquid operating chamber therebetween, a stationary casing enclosing said members, and forming a reservoir tank above the axis of the coupling, a discharge port leading from the periphery of said chamber to said tank, one of said members being axially movable to control the discharge of the liquid from said chamber through said discharge port.

19. A hydraulic coupling including a driving member and a driven member conjointly defining a liquid operating chamber, a cooling tank mounted above the coupling and closely adjacent thereto, said coupling being provided with a discharge conduit leading from said operating chamber to said cooling tank, said conduit leading from a point near the outer periphery of said chamber, and extending in a direction whereby the liquid is delivered into the interior of said cooling tank against gravity, and under the action of centrifugal force, a reservoir tank connected closely adjacent to said coupling and below said cooling tank, the bottom of said tank being mounted above the axis of the coupling, a connection leading from said cooling tank into said reservoir tank, and extending in a direction whereby the liquid may gravitate from said cooling tank into said reservoir tank, and a valve controlled passageway leading from the bottom of said tank into the interior of said chamber.

20. A hydraulic coupling including a driving member and a driven member conjointly defining a liquid operating chamber therebetween, a rotatable casing completely enclosing said members, and provided with a controllable port near the outer periphery thereof, and a stationary casing completely enclosing said rotatable casing, and forming a passageway aligned with said port, whereby the liquid may be discharged under the action of centrifugal force, from said chamber through said port and said passageway.

21. A hydraulic coupling including a driving member and a driven member conjointly defining a liquid operating chamber therebetween, a rotatable casing completely enclosing said members, and connected to one of said members for rotation therewith, a stationary casing completely enclosing said rotatable casing, said rotatable casing being provided with a discharge port at the periphery thereof, a vent pipe leading from a point near the center of said chamber to the space between said members and said rotatable casing, and a conduit leading from said stationary casing, and adapted to discharge the fluids collected in said last mentioned space.

22. A hydraulic coupling including a driving member and a driven member conjointly defining a liquid operating chamber therebetween, a reservoir disposed above the axis of said members, a discharge port leading from the periphery of said operating chamber, for delivering liquid in an upward direction to said reservoir by centrifugal force, and against the action of gravity to said reservoir, and a connection leading from said reservoir to the interior of said operating chamber, and extending in a direction whereby the liquid may return to said operating chamber by gravity.

Signed at Hamburg, Germany, this 9th day of October, A. D. 1930.

JOHANN NIKOLAUS KIEP.